(12) United States Patent
Gotteland et al.

(10) Patent No.: US 9,080,090 B2
(45) Date of Patent: Jul. 14, 2015

(54) SPECIFIC FLUID FOR CONVERTING LIGHT RADIATION TO HEAT

(75) Inventors: Yves Didier Gotteland, Millas (FR); Maurice Husson, Chalons en Champagne (FR); Jean-Paul Longuemard, Sainte Catherine (FR)

(73) Assignee: OMYA INTERNATIONAL AG, Oftringen (CH)

( * ) Notice: Subject to any disclaimer, the term of this patent is extended or adjusted under 35 U.S.C. 154(b) by 46 days.

(21) Appl. No.: 13/381,432

(22) PCT Filed: Jun. 24, 2010

(86) PCT No.: PCT/FR2010/051293
§ 371 (c)(1),
(2), (4) Date: Dec. 29, 2011

(87) PCT Pub. No.: WO2011/001072
PCT Pub. Date: Jan. 6, 2011

(65) Prior Publication Data
US 2012/0097153 A1      Apr. 26, 2012

(30) Foreign Application Priority Data
Jun. 30, 2009   (FR) ...................................... 09 54464

(51) Int. Cl.
*F24J 2/04*     (2006.01)
*C09K 5/10*    (2006.01)
(Continued)

(52) U.S. Cl.
CPC . *C09K 5/10* (2013.01); *C01F 11/18* (2013.01); *F24J 2/4649* (2013.01); *C01P 2004/61* (2013.01); *C01P 2004/62* (2013.01); *C01P 2006/22* (2013.01); *Y02B 10/20* (2013.01); *Y02E 10/40* (2013.01)

(58) Field of Classification Search
CPC ...................................................... F24J 2/4649
USPC ............................................ 126/678; 252/71
See application file for complete search history.

(56) References Cited

U.S. PATENT DOCUMENTS 3,886,997 A     6/1975  Plass
4,074,482 A *   2/1978  Klahr .......................... 52/171.3
(Continued)

FOREIGN PATENT DOCUMENTS

DE     4131516 A1 *   4/1993
EP     0069404 A      1/1983
(Continued)

OTHER PUBLICATIONS

American Society for Testing and Materials. 'ASTM C1549—09 Standard Test Method for Determination of Solar Reflectance Near Ambient Temperature Using a Portable Solar Reflectometer'. 2006 [retrieved Oct. 10, 2013]. Retrieved from the Internet: <URL: http://enterprise.astm.org/filtrexx40.cgi?+REDLINE_PAGES/C1549.htm>.*

(Continued)

*Primary Examiner* — Kenneth Rinehart
*Assistant Examiner* — Jason Lau
(74) *Attorney, Agent, or Firm* — Young Basile

(57) ABSTRACT

Specific fluid, which is a site of energy conversion, characterized in that it comprises water, strongly scattering mineral powder, in general calcium carbonate, antifreeze and/or a colorant, a surfactant and an antifoam, the powder having a concentration by mass of between 1% and 3% and a median particle size of between 0.8 and 10 μm.

16 Claims, 1 Drawing Sheet

(51) Int. Cl.
    *C01F 11/18*    (2006.01)
    *F24J 2/46*    (2006.01)

(56) References Cited

U.S. PATENT DOCUMENTS

| | | | |
|---|---|---|---|
| 4,083,490 A | | 4/1978 | Cunningham et al. |
| 4,090,496 A | | 5/1978 | Mallet |
| 4,221,210 A | * | 9/1980 | Cvijanovich ................. 126/591 |
| 4,239,035 A | * | 12/1980 | Brooks et al. ................. 126/678 |
| 4,791,985 A | * | 12/1988 | Flores Bermudez ............ 166/68 |
| 6,752,972 B1 | * | 6/2004 | Fraim et al. ................... 422/198 |
| 2004/0159822 A1 | * | 8/2004 | Shirai et al. ..................... 252/74 |
| 2005/0062015 A1 | * | 3/2005 | Kobori ............................. 252/71 |
| 2005/0269548 A1 | | 12/2005 | Jeffcoate et al. |
| 2006/0148951 A1 | * | 7/2006 | Qiu et al. ...................... 524/413 |
| 2009/0082230 A1 | * | 3/2009 | Javora et al. ................. 507/269 |

FOREIGN PATENT DOCUMENTS

| | | |
|---|---|---|
| FR | 2202272 A | 5/1974 |
| FR | 2297904 A1 | 8/1976 |
| JP | 10316514 A  *  12/1998 | |

OTHER PUBLICATIONS

Montant Green Power. Frequently Asked Question:: Solar Water Heating. 2008. [retrieved on Feb. 6, 2014]. Retreived from the Internet <http://www.montanagreenpower.com/faq/solarwater.php#q8>.*

English translation of the International Preliminary Report on Patentability from the corresponding International Application No. PCT/FR2010/051293 filed Jun. 24, 2010.

XP002565118 Matrix Polyelectrolyte Microcapsules.

* cited by examiner

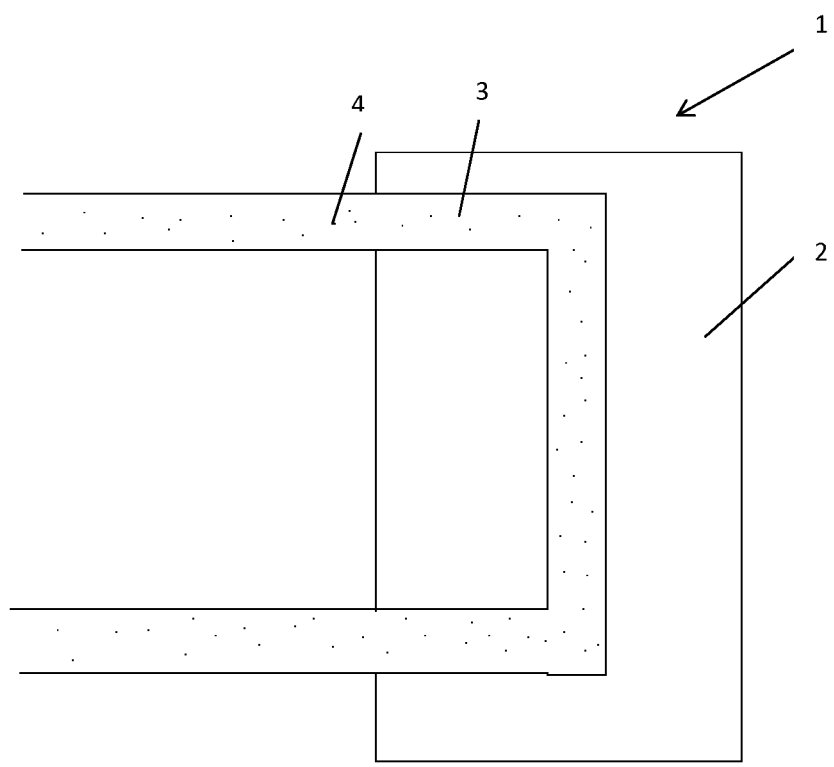

SPECIFIC FLUID FOR CONVERTING LIGHT RADIATION TO HEAT

TECHNICAL FIELD

The present invention relates to a specific fluid which is a site of energy conversion and which is also a heat-transfer fluid, subsequently termed "specific".

BACKGROUND

Many heat-transfer fluids are known and used in various applications. Air and water are commonly used owing to their natural availability. Other types of known heat-transfer fluids are organic fluids, molten salts and liquid metals.

When choosing a heat-transfer fluid for a particular application, several criteria should be taken into consideration:
  Absorptivity of the fluid.
  Temperature range over which it will be used: maximum and minimum temperatures.
  Persistence of effectiveness over time: aggressiveness of the fluid with respect to the materials used for the installation, risks of corrosion or of fouling, etc.
  Safety regulations: risks of burns, electrical risks, risks of fire, risks of explosion, toxic risks, risks associated with pressurized equipment, regulations for disposal and recycling of the fluid.
  Technical-economic criteria: investment and running costs.

In the case of a domestic solar collector intended to heat the domestic water of a dwelling, the heat-transfer fluid generally used is a mixture of water and antifreeze. This is because this fluid satisfactorily meets all the abovementioned criteria for this type of application.

However, this fluid has a limited absorptivity and the solar collector must therefore be designed so as to promote the conversion of light to heat. The yield from the solar collector is limited.

U.S. Pat. No. 4,083,490 describes a collector intended to absorb solar radiation, comprising an absorbent medium constituted of ethylene glycol, of water and of a colloidal suspension of graphite having particles of approximately 1 μm. The colloidal suspension of graphite behaves as finely divided black bodies which directly absorb a large amount of radiative energy.

SUMMARY OF THE INVENTION

A problem addressed by the present invention is that of providing a specific fluid that is particularly suitable for use in a domestic solar collector. In particular, an objective of the invention is to improve the absorptivity of the specific fluid.

The solution proposed by the invention is a specific fluid, characterized in that it comprises water and mineral powder which strongly scatters solar radiation, the strongly scattering mineral powder having a concentration by mass of between 1% and 3% and a median particle size of between 0.8 and 10 μm.

It has been noted that, by virtue of these characteristics, the specific fluid is a site of energy conversion and therefore exhibits a high absorptivity. This fluid, used in a solar collector, therefore makes it possible to improve the energy yield of the collector. In addition, the solar collector can be designed so as to direct the light to the fluid, without other measures promoting energy conversion being necessary.

Advantageously, the particles of the strongly scattering mineral powder have, on average, a light energy scattering coefficient of greater than 0.7, preferably greater than 0.9. Such an energy scattering coefficient can be measured using a reflectometer, for example by means of a method of measurement using an integrating sphere. In such a method, a particle placed at the centre of a substantially spherical collector receives an incident light energy flow. The substantially spherical collector measures the flow of energy scattered by the particle in the entire space. The energy scattering coefficient is defined as the ratio of the total flow scattered to the incident flow. The remainder to 1 of the scattering coefficient constitutes the energy absorption coefficient for the particle.

Advantageously, the strongly scattering mineral powder comprises calcium carbonate, or a synthetic or natural mineral powder. According to one embodiment, the strongly scattering mineral powder is calcium carbonate powder.

Preferably, the strongly scattering mineral powder has a median particle size of between 1 and 3 μm.

Preferably, the strongly scattering mineral powder is essentially constituted of spheroidal particles. Such shapes promote light scattering.

Preferably, the fluid comprises antifreeze, the concentration by mass of antifreeze being between 0%, limit excluded, and 40%, limit included.

An antifreeze fluid is particularly desirable for applications that may be exposed to low temperatures, for example in outside installations, according to the climate in the area where the installation is located. For example, ethylene glycol-based antifreeze fluids are available. Glycol-free organic antifreezes are also available, which have the advantage of a lack of toxicity.

Preferably, the fluid has an energy absorptivity of between 0.1 and 10 cm−1 for solar radiation, preferably of the order of 1 cm−1. This order of magnitude of the absorptivity enables absorption which is almost total after a thickness of approximately 20 to 30 mm. For this, one or more colorants may be added to the specific fluid, for example an organic liquid colorant in a concentration of between 0.2% and 1%. A coloured antifreeze product may also be used for this purpose. The absorptivity should not be too strong to allow heat conversion in the bulk of the fluid, and not a superficial absorption limited to a thin layer of the fluid which would be capable of producing excessive local heating of the superficial layer of the fluid.

Preferably, the fluid comprises a surfactant, the concentration by mass of surfactant being between 0%, limit excluded, and 3%, limit included.

Preferably, the fluid comprises an antifoam, the concentration by mass of antifoam being between 0%, limit excluded, and 3%, limit included.

An antifoam product makes it possible in particular to prevent the formation of bubbles that may increase the surface reflectivity of the fluid, and therefore to decrease its total absorption.

According to one embodiment, the concentration by mass of mineral powder is 3%, the concentration by mass of antifreeze is 30%, the concentration by mass of surfactant is between 0.2% and 0.3% and the concentration by mass of antifoam is between 0.2% and 0.3%.

Preferably, the fluid also comprises a bactericidal product. A bactericidal product is particularly desirable for applications in installations that have to remain at ambient temperature for significant periods of time, for example for solar heating installations that only operate for part of the year.

The invention also proposes the use of a specific fluid in a device for converting light radiation to heat, in which a light ray is directed towards said specific fluid, the specific fluid being the site of an energy conversion.

The invention also proposes a device for converting light radiation to heat, comprising a specific fluid arranged in such a way as to be able to receive light radiation so as to be the site of an energy conversion. Advantageously, this device comprises a solar collector.

Certain aspects of the invention are based on the idea of using a filler of strongly light-scattering powder in suspension in an energy-converting fluid, so as to cause a phenomenon of multiple light scattering in the fluid. Such a phenomenon is capable of substantially increasing the distance of actual propagation of the light in a given volume of fluid and of making the distribution of the flow of light, in the fluid, homogeneous. Thus, the scattering of the light radiation by the particles of the scattering powder, combined with the absorption of the radiation which occurs essentially in the liquid, makes it possible to produce an energy conversion and heating of the fluid in substantial volumes. This heating in bulk volume is particularly suitable for applications in which it is desired to heat a relatively high flow rate of liquid at a relatively moderate temperature. Certain aspects of the invention are based on the idea of using a scattering powder, the particle size of which is comparable to the wavelengths of the main components of solar radiation, in order to promote resonance phenomena capable of improving the effective scattering cross section of the particles.

It is recalled that, in solar radiation, most of the energy lies in a spectral range of from approximately 0.5 to approximately 1.6 µm, in particular between 0.5 and 0.7 µm.

The invention will be understood more clearly, and other objectives, details, characteristics and advantages thereof will emerge more clearly, during the following description of one particular embodiment of the invention, given only by way of nonlimiting illustration.

BRIEF DESCRIPTION OF THE DRAWINGS

The description herein makes reference to the accompanying drawing:

FIG. 1 illustrates a device for converting light radiation to heat as disclosed herein.

DETAILED DESCRIPTION OF THE EMBODIMENTS

In one embodiment, the invention proposes a specific fluid which is in particular suitable for use in a domestic solar collector. This specific fluid comprises:
  water,
  calcium carbonate powder,
  optionally, an antifreeze and/or a colorant,
  optionally, a bactericide,
  optionally, a surfactant, and
  optionally, an antifoam.

All the percentages indicated below are percentages by mass.

The concentration of calcium carbonate powder and the median particle size thereof are determined taking into account, on the one hand, the absorptivity of the specific fluid and, on the other hand, the ability of the powder to be suspended in the specific fluid. Tests carried out by the inventors have shown that the absorptivity of the specific fluid, and therefore the yield of the solar collector, increases as the concentration of powder increases, and then reaches 98% or more. This is due to the fact that, by virtue of the characteristics of the invention, the specific fluid is a site of energy conversion.

These tests have also shown that the median particle size of the powder has an influence on its ability to be suspended and to remain in suspension in the circulating heat-transfer fluid. In the context of this description, the term "median particle size" is intended to mean the particle size verified on a Malvern Mastersizer 2000 laser instrument, the metrology of which is in accordance with standard ISO 13320 (calibration using a certified reference material (CRM)).

The results of these tests are in particular the following:

Test 1 (control): The composition tested was only water. The intensity absorbed was virtually zero.

Test 2: The composition tested was a mixture of water (98%) and calcium carbonate powder (2%) having a median particle size of 10 µm. The intensity absorbed is 40% for a water height of 3 cm.

Test 3: The composition tested was a mixture of water (95%), calcium carbonate powder (2.5%) having a median particle size of 10 µm and antifreeze (2.5%).

The intensity absorbed is 80% for a water height of 3 cm.

Test 4: The composition tested was a mixture of water (between 66.7% and 66.8%), antifreeze (30%), calcium carbonate powder (3%) having a median particle size of 2 µm and surfactant (between 0.2% and 0.3%). The presence of the surfactant makes it possible to keep the powder in suspension for a longer period of time.

The inventors deduced from these tests that the concentration of calcium carbonate powder should be between 1% and 3% and that the powder should have a median particle size of between 0.8 and 10 µm. For example, the powder is Durcal 1 or Durcal 2 powder sold by the company Omya SAS.

Such a powder is constituted of calcium carbonate having a high purity, for example greater than 98%, and a very high luminosity.

According to one embodiment, the powder has a CIE whiteness, measured according to DIN 6174, such that the parameter L* is equal to a value between 94 and 98, and/or such that the parameter a* is equal to a value between 0.1 and 1.5, and/or such that the parameter b* is equal to a value between 0.5 and 4, and preferably such that the parameter L* is equal to a value between 94 and 98, the parameter a* is equal to a value between 0.1 and 1.5, and the parameter b* is equal to a value between 0.5 and 4. The CIE L*, a*, b* whiteness measured according to DIN 6174 is more preferably substantially equal to 97.5/0.5/2.4.

The presence of antifreeze makes it possible to prevent freezing of the heat-transfer fluid in the event of a negative temperature. It is, for example, the antifreeze sold under the name Neutragard. The concentration of antifreeze may be between 0 and 40%, for example 30%.

The surfactant makes it possible to improve the ability of the powder to be suspended and to remain in suspension in the heat-transfer fluid. The concentration of surfactant may be between 0 and 3%, advantageously between 0.2% and 0.3%.

Finally, the antifoam makes it possible to prevent the formation of foam, which could be detrimental to the correct operating of the solar collector. The concentration of antifoam may be between 0 and 3%, advantageously between 0.2% and 0.3%. The antifoam is, for example, Agitan 305 (registered trademark).

An example of specific fluid according to one embodiment of the invention is:
  water, quantity to make up 100%
  Neutragard antifreeze, 30%
  Durcal 1 powder, 3%
  surfactant, 0.2% to 0.3%
  Agitan 305 antifoam, 0.2% to 0.3%.

This specific fluid is suitable for a domestic solar collector. In particular, the various components do not present any health risk (in the event of the heat-transfer fluid leaking into the water heater), are available relatively inexpensively, do not present any risk of damage to the installation and can be disposed of or recycled without difficulty. In addition, compared with water, it has a greater absorptivity, which improves the yield of the solar collector.

As a non-limiting example, FIG. 1 illustrates a device 1 for converting light radiation to heat and includes a solar collector 2 with the specific fluid 3 with particles 4 of a strongly scattering powder flowing through a tube proximate the solar collector 2.

The specific fluid can also be used in any other application, for example domestic or industrial, in which light radiation must be converted to heat. It may involve a natural or artificial, and visible or infrared, light ray.

Although the invention has been described in connection with a particular embodiment, it is quite obvious that it is in no way limited thereto and that it comprises all the technical equivalents of the means described and also the combinations thereof if the latter fall within the context of the invention.

In particular, the invention is not limited to calcium carbonate powder, but is broadened to other natural or synthetic mineral powders.

During the manufacture of the specific fluid, the mineral powder can be added in the form of a dry powder or of a liquid suspension.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A specific fluid suitable for converting solar light radiation to heat comprising:
   liquid water; and
   a filler in suspension in the liquid water, the filler comprising a strongly scattering powder of calcium carbonate which scatters light homogeneously through the liquid water to evenly heat the liquid water, the strongly scattering powder having a concentration by mass of between 1% and 3% and a median particle size of between 0.8 and 10 µm, particles of the strongly scattering powder having, on average, a light energy scattering coefficient of greater than 0.7.

2. The specific fluid according to claim 1, wherein the strongly scattering powder has a median particle size of between 1 and 3 µm.

3. The specific fluid according to claim 1, wherein the strongly scattering powder consists essentially of spheroidal particles.

4. The specific fluid according to claim 1, wherein the strongly scattering powder has a CIE whiteness, measured according to DIN 6174, such that a parameter $L^*$ is equal to a value between 94 and 98, and such that a parameter $a^*$ is equal to a value between 0.1 and 1.5, and such that a parameter $b^*$ is equal to a value between 0.5 and 4, and combinations thereof.

5. The specific fluid according claim 1, further comprising antifreeze, wherein a concentration by mass of antifreeze is between 0%, limit excluded, and 40%, limit included.

6. The specific fluid according to claim 1, wherein the specific fluid has an energy absorptivity of between 0.1 and 10 $cm^{-1}$ for solar radiation, the energy absorptivity defined as the amount of light which is absorbed by the specific fluid as a function of the distance into the specific fluid.

7. The specific fluid according to claim 1 further comprising a surfactant, wherein a concentration by mass of surfactant is between 0%, limit excluded, and 3%, limit included.

8. The specific fluid according to claim 1 further comprising an antifoam, wherein a concentration by mass of antifoam is between 0%, limit excluded, and 3%, limit included.

9. The specific fluid according to claim 1, wherein the concentration by mass of strongly scattering powder is 3%, the specific fluid further comprising antifreeze having a concentration by mass of 30%, a surfactant having a concentration by mass of between 0.2% and 0.3% and an antifoam having a concentration by mass of between 0.2% and 0.3%.

10. The specific fluid according to claim 1 further comprising a bactericidal product.

11. Use of a specific fluid according to claim 1, in a device for converting light radiation to heat, in which a light ray is directed towards the specific fluid, the specific fluid being a site of energy conversion.

12. A device for converting solar light radiation to heat, comprising a specific fluid configured to receive light radiation so as to be evenly heated throughout a liquid volume due to homogenous scattering of light, wherein the specific fluid is according to claim 1.

13. The device according to claim 12, comprising a solar collector.

14. The device according to claim 13, wherein the device is a domestic water heater for heating water for a residence, wherein
   the specific fluid circulates in channels of the solar collector to expose the specific fluid to light radiation, and wherein
   the solar collector is configured to direct the light radiation to the specific fluid and to expose the specific fluid to the light radiation.

15. The device according to claim 14, wherein the specific fluid has an energy absorptivity of between 0.1 and 10 $cm^{-1}$ for solar radiation, the energy absorptivity defined as the amount of light which is absorbed by the specific fluid as a function of the distance into the specific fluid.

16. The specific fluid according to claim 1, wherein the calcium carbonate is equal to or greater than 98% pure.

* * * * *